(12) United States Patent
Spector

(10) Patent No.: US 11,696,073 B2
(45) Date of Patent: Jul. 4, 2023

(54) REFRACTIVE EYE EXAMINATION SYSTEM

(71) Applicant: NYMC Biotechnology Commercialization, LLC, Valhalla, NY (US)

(72) Inventor: Donald Spector, Jupiter, FL (US)

(73) Assignee: NYMC Biotechnology Commercialization, LLC, Valhalla, NY (US)

( * ) Notice: Subject to any disclaimer, the term of this patent is extended or adjusted under 35 U.S.C. 154(b) by 330 days.

(21) Appl. No.: 17/084,816

(22) Filed: Oct. 30, 2020

(65) Prior Publication Data

US 2021/0051407 A1  Feb. 18, 2021

Related U.S. Application Data

(63) Continuation-in-part of application No. 16/702,892, filed on Dec. 4, 2019, now Pat. No. 10,863,274, (Continued)

(51) Int. Cl.
*A61B 3/113* (2006.01)
*A61B 3/00* (2006.01)
*A61B 3/024* (2006.01)
*A61B 3/10* (2006.01)
*H04R 3/12* (2006.01)
*H04R 27/00* (2006.01)
*G06F 3/16* (2006.01)
(Continued)

(52) U.S. Cl.
CPC ............... *H04R 3/12* (2013.01); *G06F 3/165* (2013.01); *H04H 60/58* (2013.01); *H04L 65/612* (2022.05); *H04R 27/00* (2013.01); *H04H 20/82* (2013.01); *H04H 60/65* (2013.01); *H04H 2201/40* (2013.01); *H04L 65/765* (2022.05); *H04R 2227/003* (2013.01); *H04R 2420/07* (2013.01); *H04R 2499/11* (2013.01); *H04R 2499/15* (2013.01)

(58) Field of Classification Search
None
See application file for complete search history.

(56) References Cited

U.S. PATENT DOCUMENTS 6,389,463 B2   5/2002   Bolas
7,003,515 B1   2/2006   Glaser et al.
(Continued)

*Primary Examiner* — Tuan A Tran
(74) *Attorney, Agent, or Firm* — Collard & Roe, P.C.

(57) ABSTRACT

A system and method for conducting a refractive examination of an eye of a patient, has a communication device with a communication module that connects to the internet, a processor that is programmed to connect to a remote computer via the communication module and which has a display screen, a microphone and a speaker. The remote computer has a data storage device that stores images of eye charts. The communication device is mounted in a virtual reality headset configured to be worn by the patient and has at least one screen through which the display screen of the communication device is viewable. The communication device displays images in the form of the eye charts to the patient, who communicates through the communication to a remote examiner who conducts the refractive examination using multiple different eye charts to determine the prescription of the patient.

9 Claims, 3 Drawing Sheets

Related U.S. Application Data which is a continuation-in-part of application No. 15/787,813, filed on Oct. 19, 2017, now Pat. No. 10,536,496, which is a continuation-in-part of application No. 15/581,209, filed on Apr. 28, 2017, now Pat. No. 9,936,316, which is a continuation-in-part of application No. 15/401,773, filed on Jan. 9, 2017, now Pat. No. 9,693,140, which is a continuation of application No. 15/161,658, filed on May 23, 2016, now Pat. No. 9,584,913, which is a continuation-in-part of application No. 14/710,707, filed on May 13, 2015, now Pat. No. 9,367,285, which is a continuation-in-part of application No. 13/856,795, filed on Apr. 4, 2013, now Pat. No. 9,060,040, which is a continuation-in-part of application No. 13/331,469, filed on Dec. 20, 2011, now Pat. No. 8,467,722, which is a continuation-in-part of application No. 12/180,901, filed on Jul. 28, 2008, now Pat. No. 8,099,039.

(60) Provisional application No. 63/063,166, filed on Aug. 7, 2020, provisional application No. 60/954,879, filed on Aug. 9, 2007.

(51) Int. Cl.
*H04H 60/58* (2008.01)
*H04L 65/612* (2022.01)
*H04H 20/82* (2008.01)
*H04H 60/65* (2008.01)
*H04L 65/75* (2022.01)

(56) References Cited

U.S. PATENT DOCUMENTS

| | | | |
|---|---|---|---|
| 7,058,356 B2 | 6/2006 | Slotznick | |
| 7,059,728 B2 | 6/2006 | Alasaarela et al. | |
| 7,065,342 B1 | 6/2006 | Rolf | |
| 7,738,151 B2 | 6/2010 | Garner et al. | |
| 7,817,591 B2 | 10/2010 | Cooley | |
| 7,873,040 B2 | 1/2011 | Karlsgodt | |
| 8,260,230 B2 | 9/2012 | Zigler et al. | |
| 8,467,722 B2 | 6/2013 | Spector | |
| 8,472,866 B1 | 6/2013 | Spector | |
| 8,543,095 B2 | 9/2013 | Brown et al. | |
| 8,725,065 B2 | 5/2014 | Spector | |
| 9,060,040 B2 | 6/2015 | Spector | |
| 10,714,217 B2 * | 7/2020 | Seriani | G16H 15/00 |
| 10,762,994 B2 * | 9/2020 | Seriani | A61B 3/0033 |
| 10,888,222 B2 * | 1/2021 | Monhart | A61B 3/11 |
| 10,916,347 B2 * | 2/2021 | Seriani | G16H 80/00 |
| 10,983,351 B2 * | 4/2021 | Samec | A61B 3/1216 |
| 11,256,096 B2 * | 2/2022 | Samec | A61B 5/361 |
| 2004/0046783 A1 | 3/2004 | Montebovi | |
| 2004/0198175 A1 | 10/2004 | Shively et al. | |
| 2005/0248233 A1 | 11/2005 | Pompei | |
| 2006/0168097 A1 | 7/2006 | Pittelli | |
| 2008/0086687 A1 | 4/2008 | Sakai et al. | |
| 2008/0194175 A1 | 8/2008 | Last et al. | |
| 2010/0042920 A1 | 2/2010 | Sigal | |
| 2012/0019883 A1 | 1/2012 | Chae et al. | |
| 2013/0021579 A1 * | 1/2013 | Husain | A61B 3/032 351/246 |
| 2013/0230179 A1 | 9/2013 | Beaty et al. | |
| 2014/0133664 A1 | 5/2014 | Beaty et al. | |
| 2014/0342660 A1 | 11/2014 | Fullam | |
| 2014/0375771 A1 * | 12/2014 | Gabara | H04N 13/296 348/46 |
| 2015/0142536 A1 | 5/2015 | Marlow et al. | |
| 2015/0256564 A1 | 9/2015 | Reynolds | |
| 2017/0231487 A1 * | 8/2017 | Carrafa | A61B 3/0041 351/223 |
| 2018/0263488 A1 * | 9/2018 | Pamplona | A61B 3/0041 |
| 2019/0125181 A1 * | 5/2019 | Lindig | A61B 3/113 |
| 2019/0142270 A1 * | 5/2019 | Monhart | A61B 3/032 351/209 |
| 2020/0320770 A1 * | 10/2020 | Charlson | G06Q 50/26 |
| 2020/0397288 A1 * | 12/2020 | Zidan | A61B 5/163 |
| 2021/0030270 A1 * | 2/2021 | Goyal | A61B 3/10 |

* cited by examiner

REFRACTIVE EYE EXAMINATION SYSTEM

CROSS REFERENCES TO RELATED APPLICATIONS

This application is a continuation in part of U.S. patent application Ser. No. 16/702,892, filed on Dec. 4, 2019, which is a continuation in part of U.S. patent application Ser. No. 15/787,813, filed on Oct. 19, 2017, which is a continuation in part of U.S. patent application Ser. No. 15/581,209, filed on Apr. 28, 2017 (now U.S. Pat. No. 9,936,316 issued Apr. 3, 2018), which is a continuation in part of U.S. patent application Ser. No. 15/401,773, filed on Jan. 9, 2017 (now U.S. Pat. No. 9,693,140 issued Jun. 27, 2017), which is a continuation under 35 U.S.C. § 120 of U.S. patent application Ser. No. 15/161,658, filed on May 23, 2016 (now U.S. Pat. No. 9,584,913 issued Feb. 28, 2017), which is a continuation-in-part of U.S. patent application Ser. No. 14/710,707, filed on May 13, 2015 (now U.S. Pat. No. 9,367,285 issued Jun. 14, 2016), which is a continuation-in-part of U.S. patent application Ser. No. 13/856,795, filed on Apr. 4, 2013 (now U.S. Pat. No. 9,060,040 issued Jun. 16, 2015), which is a continuation in part of U.S. patent application Ser. No. 13/331,469 filed on Dec. 20, 2011 (now U.S. Pat. No. 8,467,722 issued Jun. 18, 2013), which is a continuation-in-part of U.S. patent application Ser. No. 12/180,901 filed Jul. 28, 2008 (now U.S. Pat. No. 8,099,039 issued Jan. 17, 2012), which claims the benefit of priority under 35 U.S.C. § 119(e) to U.S. Provisional Patent Application Ser. No. 60/954,879, filed Aug. 9, 2007, the entirety of all of which is hereby incorporated by reference. This application also claims priority under 35 USC 119(e) of U.S. Provisional Application Ser. No. 63/063,166 filed on Aug. 7, 2020.

BACKGROUND OF THE INVENTION

This application relates to the field of internet receivers that are capable of receiving Internet radio signals or audio and/or visual signals from a stored playlist or database. More specifically, this application relates to speakers and video screens that relate to a specific station or database that is received through these devices by BLUETOOTH®, Wi-Fi or Wi-Max. It is also noted that one BLUETOOTH®, Wi-Fi or Wi-Max Internet receiver may be used to supply signals to multiple speakers and screens.

The combination of internet-based audio transmissions with digital images has led to great improvements in entertainment, information distribution and healthcare. The present invention relates to the use of audio and visual transmissions through the internet to accomplish a refractive eye exam, thus eliminating the need for a patient to visit an optometrist in person.

SUMMARY OF THE INVENTION

It is therefore an object of the invention to configure a system in which a refractive eye examination can be conducted using audio and video transmissions through the internet and/or other systems, such as BLUETOOTH® This object is accomplished according to the invention by a system configured for conducting a refractive examination of an eye of a patient that has a communication device such as a smartphone, the communication device comprising a communication module that connects to the internet or other information highway, preferably wirelessly, and is configured to transmit and receive information over the internet or other information highway and a processor that is programmed to connect to a remote computer via the communication module. The remote computer has a data storage device that stores images of eye charts. The communication device further has a user interface that is configured for allowing a user to control processes of the processor, a display screen, at least one speaker connected to the processor to play signals received by the processor, and at least one microphone connected to the processor.

The communication device is mounted in a headset configured to be worn by the patient, so that the patient can view the display screen of the communication device while wearing the headset. The headset can be a standard Virtual Reality "VR" headset that is commercially available or can be custom designed for this purpose. The communication device is wirelessly connected to a remote computer having a database of several eye charts that can be displayed on the display screen of the communication device. An application program of the communication device allows the eye charts to be displayed there. The general format of the eye charts can be configured in any standard way that Optometrists and Ophthalmologists use to determine the patent's refractive needs. Assorted letters, numbers, symbols and/or shapes, in varying sizes, can be displayed.

In a preferred embodiment, the headset has two separate viewing sections, so that when the headset is worn by the patient, one part of the display screen is visible by only one eye of the patient and the other part of the display screen is visible only by the other eye of the patient. The eye charts can be displayed on the display screen so that an entire eye chart is shown to a single eye of the wearer. Alternatively, both sides of the display screen can display the same eye chart, for viewing with both eyes. This way, the optometrist can display the eye chart on the eyes individually, or both at the same time, to check the refraction.

The optometrist is located at a computer in a remote location. The computer has a database that stores the images of the eye charts, and a processor that connects to the communication device for transmitting the eye charts to the communication device for display to the patient.

The database of eye charts contains a wide selection of eye charts that have been modified to simulate various refractions that a patient with different degrees of myopia, hyperopia, presbyopia, astigmatism or other refractive condition would need. For example, in the standard eye chart, if the patient can only read the top two rows of letters or symbols, the optometrist can choose a chart that is configured with a certain degree of correction, and load that onto the communication device for viewing by the patient. The optometrist continues loading different eye charts onto the communication device until the patient indicates that they can see the eye chart sufficiently clearly.

Once the correct version of the eye chart is documented for each eye, the optometrist can prepare the prescription for the patient. Each eye chart in the database is correlated with a specific prescription. The processor can also be programmed with software that automatically prepares the prescription based on the selected corrected eye charts. The prescription can then be sent manually or automatically to the patient via email or text message, or can be loaded into an online account of the patient for later use.

The communication between the patient and the optometrist can take place audibly using the communication device, communicating via standard cellular signals, or over the internet. As each eye chart is presented, the patient reads it out and the information is transmitted from the microphone of the communication device to the remote computer of the optometrist, or directly to a telephone being used by the optometrist.

DETAILED DESCRIPTION

As used in this specification and the appended claims, the singular forms "a", "an" and "the" include plural referents unless the context clearly indicates otherwise.

As used in this specification and the appended claims, "internet" refers not only to the internet, but also to any wide area network or local area network. Use of the term "internet" is not intended to limit the present invention to communications received via the world wide web.

As used in this specification and the appended claims, a "speaker" means any sound emitting device and is not limited to standard electromechanical transducer type speakers. Non-limiting examples of suitable speakers are piezoelectric speakers, electrostatic speakers, flat panel speakers and digital speakers.

As used in the specification and the appended claims, a "smartphone" is a mobile telephone equipped with internet capability.

As used in the specification and the appended claims, an "application" or "app" is a software program installed on a smartphone, which can perform certain functions directly or is used to directly connect the smartphone to an internet-based program via a link on the display screen of the smartphone.

The various embodiments and aspects of the invention described here can be employed individually or in conjunction with other embodiments and aspects. Descriptions of individual aspects and embodiments does not preclude the inclusion of other aspects, embodiments or additional structural components.

Figure 1:
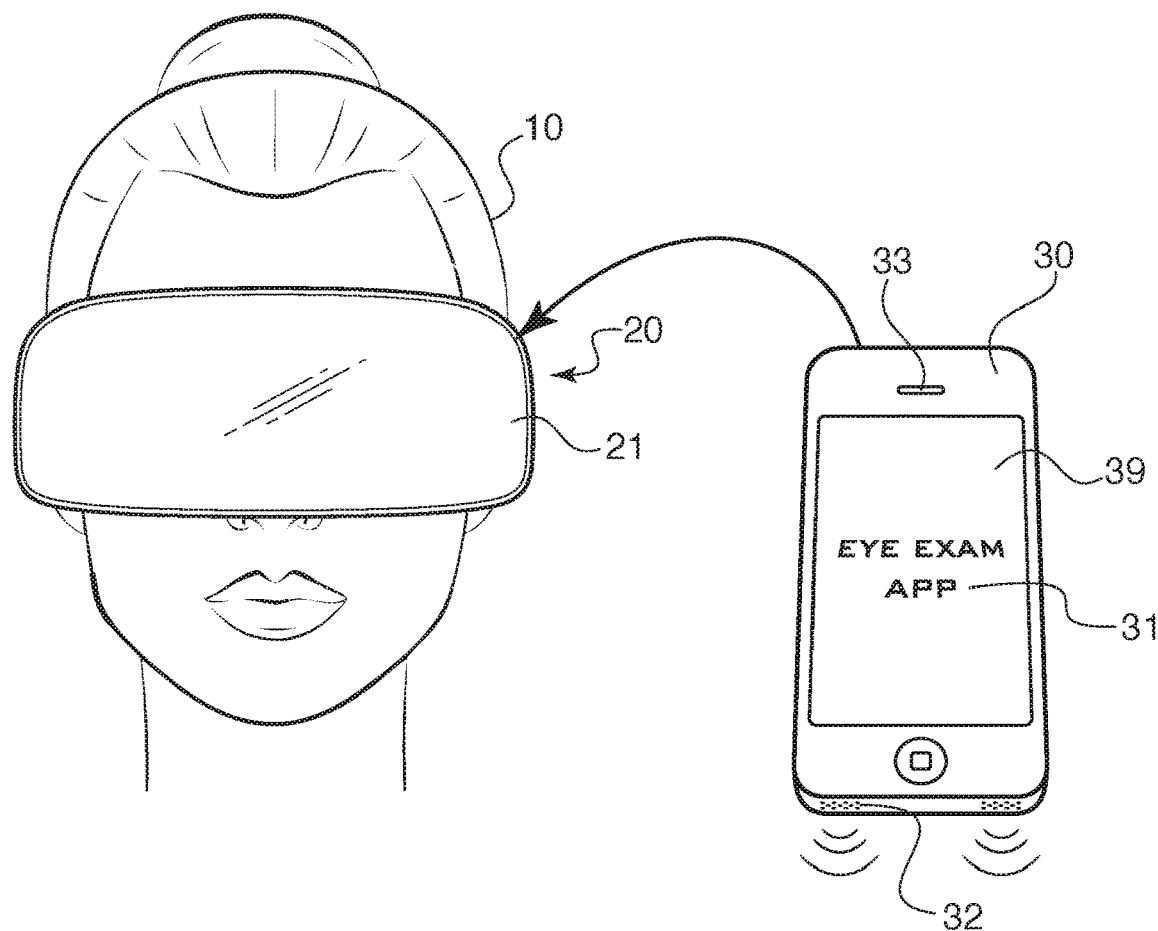
FIG. 1 shows the communication device and the headset on a patient.
Figure 2:
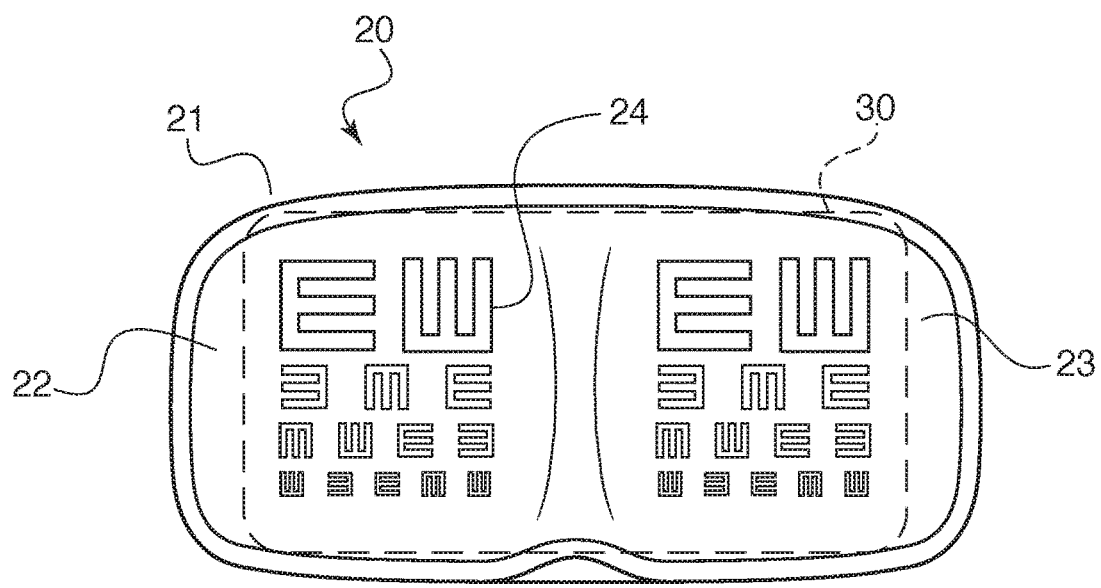
FIG. 2 shows the patient's view while wearing the headset and both screens displaying the eye chart.

As shown in FIGS. 1 and 2, the devices needed by patient 10 to complete a refractive eye examination according to the present invention include a headset 20 having a frame 21 and display screens 22, 23. Headset 20 is configured to allow for mounting a mobile telephone 30 right in front of display screens 22, 23, for viewing by the wearer. Headset 20 can be connected to mobile telephone 30 to allow for controlling functions of the headset and playing sounds from the mobile telephone through the headset, or can act as merely a mount for mobile telephone 30. Headset 20 can be any commercially available Virtual Reality (VR) headset.

Figure 3:
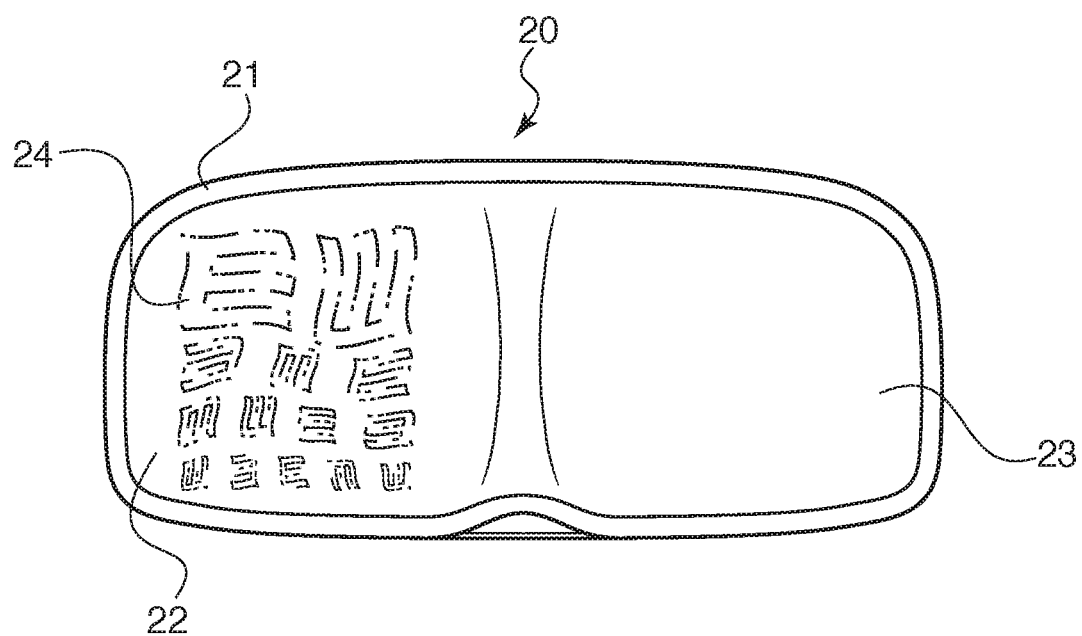
FIG. 3 shows the patient's view while wearing the headset in an uncorrected format.
Figure 4:
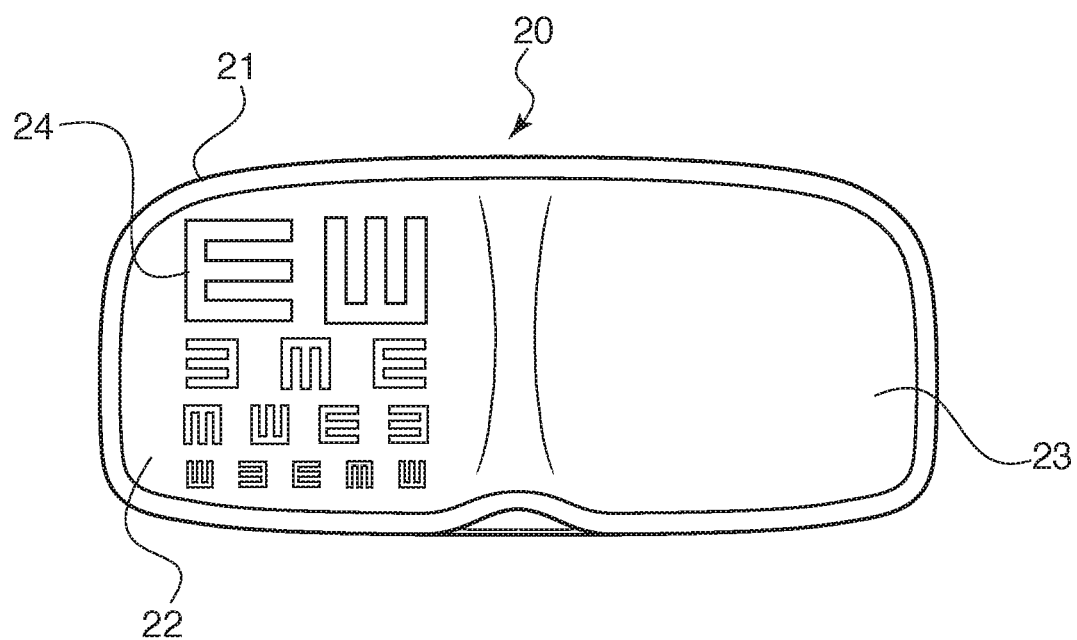
FIG. 4 shows the view of FIG. 3 with a correction made to the display to simulate a corrective lens.
Figure 5:
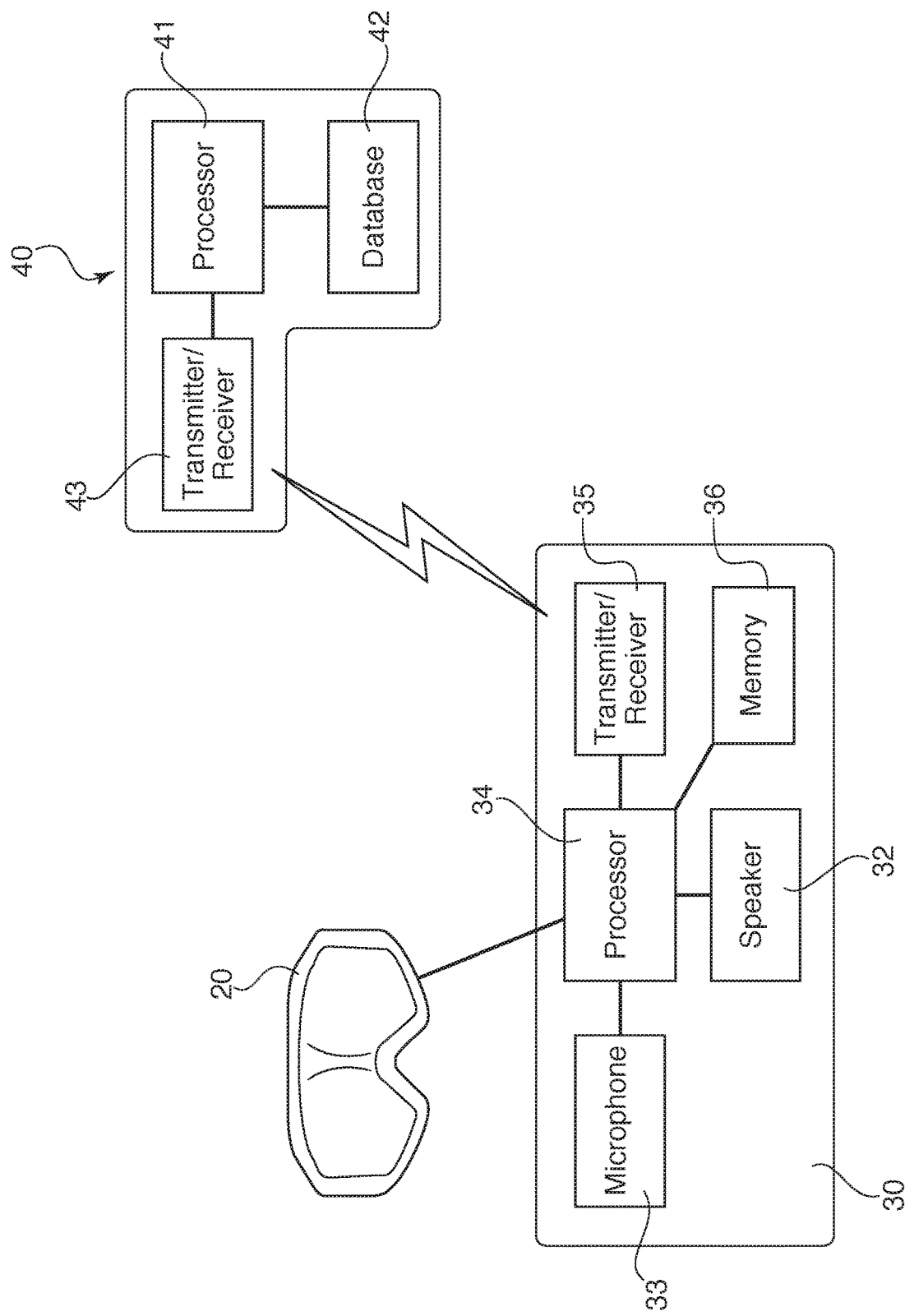
FIG. 5 shows a block diagram of the components according to the invention.

Smartphone 30 is equipped with speakers 32, a microphone 33, a display screen 39, a processor 34 and a transmitter/receiver 35 for cellular and/or wireless internet communication with a processor in a remote computer 40, such as shown in FIG. 5. Processor 34 is connected to a memory 36 that stores a software application 31 for conducting refractive eye examinations. Using software application 31, the user connects smartphone 30 to a processor 41 in remote computer 40 which is operated by an optometrist or other medical professional. The medical professional sends an image 24 in the form of an eye chart, which is stored in database 42, to software application 31, and is displayed on display screen 39 of smartphone 30 and is viewable through one or both of screens 22, 23 of headset 20 for the user 10 to see. The user 10 uses microphone 33 of smartphone 30 to indicate to the medical professional, via the microphone 33, the user's ability to read the eye chart. The medical professional can communicate further instructions to the user via speakers 32 on smartphone 30, which can also be transmitted via speakers on headset 20 if applicable. As shown in FIG. 3, if the image 24 seen by the user is blurry, the medical professional can choose another eye chart with a virtual correction imbedded in it. Different versions of the eye chart are displayed to the patient until the displayed image is clear to the patient, such as shown in FIG. 4. The database 42 can store unlimited versions of the eye charts to compensate for any type of refractive condition. Each eye chart corresponds to a distinct degree of correction when viewed by the patient 10 in headset 20. The eye charts in the form of images 24 can be displayed on both screens 22, 23, so as to be visible by both eyes, or only on one screen (via showing on only half of the display of smartphone 30), for testing of a single eye, such as shown in FIGS. 3 and 4. The eye charts are created with the assumption that they will be viewed through the headset 20 at a defined distance from the patient 10's eye.

It is to be understood that the invention is not limited to the details of construction or process steps set forth in the following description. The invention is capable of other embodiments and of being practiced or being carried out in various ways.

While there have been shown, described and pointed out fundamental novel features of the invention as applied to preferred embodiments or aspects thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

What is claimed is:

1. A system configured for conducting a refractive examination of an eye of a patient, comprising:
 a communication device comprising:
  a communication module that connects to the internet or other information highway and configured to transmit and receive information over the internet or other information highway; and
  a processor that is programmed to connect to a remote computer via the communication module, the remote computer having a data storage device, the data storage device storing images of eye charts, wherein the images of eye charts are constructed to simulate refractions that are needed to correct at least one condition selected from the group consisting of myopia, hyperopia, presbyopia and astigmatism, wherein each image is correlated with a specific prescription; wherein the processor is programmed to display the eye charts from the data storage device, and
  a user interface that is configured for allowing a user to control processes of the processor;
  a display screen configured for displaying images via the processor;
  a least one speaker connected to the processor, the speaker being adapted to play signals received by the processor, at least one microphone connected to the processor, and a headset configured to be worn by the patient, and being configured for mounting the communication device thereto such that the display screen of the communication device is viewable by a the patient when the patient is wearing the headset, wherein the headset has separate screens for each eye of the patient, such that half of the display screen of the communication device is viewable through each one of the screens of the headset, wherein when a patient wears the headset with the communication device mounted thereon, the eye charts are displayable to the user via the display screen of the communication device.

2. The system of claim 1, wherein the communication device wirelessly connects to the internet or other information highway.

3. The system of claim 1, wherein the communication device is a mobile telephone.

4. The system of claim 1, wherein the eye charts contain letters or numbers in varying sizes.

5. A method for conducting a refractive examination of a patient's eye when the patient is in a location remote from an examiner, comprising:

connecting a virtual reality headset having a display screen to a wireless communication device having a processor, a speaker, a display screen, a microphone and a communication module for connecting to the internet or other information highway, so that the display screen of the wireless communication device is viewable through the display screen of the virtual reality headset, connecting the wireless communication device to a remote computer having a database of stored images of eye charts, placing the virtual reality headset on a patient so that the display screen of the wireless communication device is visible by the patient, displaying one of the images of the eye charts onto the display screen of the communication device, receiving information from the patient transmitted through the communication module regarding the patient's ability to read the displayed eye chart, and displaying other images of eye charts on the display screen until the patient selects an eye chart that the patent is able to read clearly, and preparing a prescription for corrective lenses based on the selected eye chart, wherein the images are made with varying degrees of clarity to simulate correction of different refractive conditions of an eye selected from the group consisting of myopia, hyperopia, presbyopia and astigmatism, and wherein each image is correlated with a specific prescription.

6. The method according to claim 5, wherein the eye charts consist of letters or numbers in varying sizes.

7. The method according to claim 5, wherein the information from the patient is transmitted audibly via the microphone in the wireless communication device.

8. The method according to claim 5, wherein the step of preparing the prescription takes place automatically by the processor in the computer calculating a prescription correlating to the selection of the user.

9. (Original The method according to claim 5, further comprising transmitting the prescription from the computer to the wireless communication device.

* * * * *